United States Patent [19]
Heravi

[11] Patent Number: 6,046,893
[45] Date of Patent: Apr. 4, 2000

[54] PROGRAMMABLE ELECTRONIC CURRENT LIMITER

[75] Inventor: Oliver Heravi, Salem, Oreg.

[73] Assignee: Warn Industries, Inc., Milwaukie, Oreg.

[21] Appl. No.: 09/092,738

[22] Filed: Jun. 6, 1998

[51] Int. Cl.[7] .................................................. H02H 5/04
[52] U.S. Cl. ............................................ 361/23; 318/434
[58] Field of Search ................................ 361/23, 31, 93, 361/24; 254/271, 276, 362; 318/430, 434

[56] References Cited

U.S. PATENT DOCUMENTS

| | | | |
|---|---|---|---|
| 3,965,407 | 6/1976 | Stoner | 318/432 |
| 4,260,938 | 4/1981 | Joyes | 318/434 |
| 4,517,506 | 5/1985 | Heinrich | 318/847 |
| 4,532,571 | 7/1985 | Satou | 361/93 |
| 4,713,720 | 12/1987 | Rogers | 361/97 |
| 4,854,547 | 8/1989 | Oliphant | 254/271 |
| 4,873,474 | 10/1989 | Johnson | 318/434 |
| 4,905,117 | 2/1990 | Beg | 361/93 |
| 4,956,590 | 9/1990 | Phillips | 318/432 |
| 4,987,358 | 1/1991 | Branam | 318/603 |
| 5,214,359 | 5/1993 | Herndon | 318/434 |
| 5,436,579 | 7/1995 | Tran | 326/98 |
| 5,448,143 | 9/1995 | Pecone | 318/434 |
| 5,448,442 | 9/1995 | Farag | 361/24 |
| 5,648,887 | 7/1997 | Herndon | 361/31 |
| 5,768,079 | 6/1998 | Buell | 361/78 |

FOREIGN PATENT DOCUMENTS

| | | |
|---|---|---|
| 54-153248 | 12/1979 | Japan . |
| 56-12890 | 7/1981 | Japan . |

*Primary Examiner*—Sally C. Medley
*Attorney, Agent, or Firm*—Robert L. Harrington

[57] ABSTRACT

A programmable electronic current limiter for a winch includes a signal conditioning circuit monitoring a differential signal taken from a resistive element of the winch motor and providing a stable DC voltage signal representing in linear fashion motor load conditions. By setting a threshold within the range of the DC load signal, motor operation halts in response to load conditions exceeding the selected threshold. The threshold may be established explicitly by application or may be adopted as a function of actual load conditions during a programming step. Overall, the device is more accurate and more responsive than prior electronic current limiters thereby provides greater protection against damage or deterioration of a winch and its supporting structures.

15 Claims, 12 Drawing Sheets

Microfiche Appendix Included
(1 Microfiche, 18 Pages)

PROGRAMMABLE ELECTRONIC CURRENT LIMITER

REFERENCE TO MICROFICHE APPENDIX

This application includes a microfiche appendix provided separately and including one microfiche and 18 frames.

BACKGROUND OF THE INVENTION

The present invention relates generally to a winch and associated control circuitry used to pull or lift heavy loads, and relates particularly to an electronic current limiting device sensing a magnitude of current used by the winch and halting operation of the winch as a function of the magnitude of electric current drawn. While illustrated in the context of a winch, it will be understood that the present invention also relates to applications where an electric motor operates to move a load and where potential damage exists when the load force exceeds an acceptable load force threshold.

Winches support a wide range of applications and assume a variety of sizes and types. Winches typically have an upper load limit. A winch may be rated, for example, as a 10,000 pound winch indicating that load bearing components may withstand an applied load force to a maximum of 10,000 pounds.

Potential damage or actual damage exists when a winch is driven beyond its rating, i.e., placed under a load condition exceeding its rating. Without some form of shut-off mechanism, the weakest components of the winch potentially break or deteriorate. Unfortunately, destructive failure often presents the first indication that a load limit has been exceeded. In other words, often there is no warning that a damaging or destructive condition exists. Not only can winch damage or destruction be costly in repair services and shut down time, it also represents a safety hazard to those working with or in the vicinity of the winch. Even in cases where the components of the winch are designed to far exceed its load limit rating, damage may occur to supporting structures or to the item being pulled or lifted. The operator/user may simply want conservative assurance that the load limit will not be exceeded in any event. The subject matter of the present invention finds application in maintaining loads at or below a selected load force.

Sensing the load condition on a given winch may be accomplished by sensing the magnitude of current delivered to the winch. U.S. Pat. No. 4,873,474, issued Oct. 10, 1989 to Johnson and assigned in common to the assignee of the present invention, illustrates a winch with a shut-off load limiting device. Generally, the load limiting device of U.S. Pat. No. 4,873,474 senses a magnitude of current delivered to the winch and shuts off winch operation when current exceeds a given magnitude. The load limiting device of U.S. Pat. No. 4,873,474 allows adjustment in a threshold current used as a basis for triggering winch shut down.

U.S. Pat. No. 5,214,359, issued May 25, 1993 to Herndon, et al and assigned to the assignee of the present invention, also illustrates a winch having an electronic current limiter to shut off power to the winch motor when a load limit has occurred.

U.S. Pat. No. 5,648,887, issued Jul. 15, 1997 to Herndon, et al and assigned to the assignee of the present invention, also illustrates a winch system including an electric motor protected against an overload condition by use of a current sense device and a current limiting device. The device shown in U.S. Pat. No. 5,648,887 responds to specific state conditions of the device and operates to protect the electric motor against damage in reaction to the existing operating condition and state.

Each of the above-noted U.S. Pat. No. 4,873,474; 5,214,359; and 5,648,887 employ as a current sensing device a hall effect device and/or, a torid device. These current sensing devices are inherently slow devices and, when used as the primary current sensing device for purposes of detecting load conditions, introduce significant delay into the process of detecting a given load magnitude and reacting to a given load magnitude exceeding a selected threshold load. Accordingly, there exists need for a faster and more accurate mechanism for detecting load conditions and halting operation of an electric motor as a function of existing load conditions exceeding a selected threshold load magnitude.

Another major issue regarding use of hall effect transducers and torids is the interface required relative to the winch. To use a torid, for example, it must interface with an actual current carrying portion of the winch. Typically, the torid must encircle the bus bar, i.e., a major current carrying portion of the winch. This places the current sensing at a particular location within the winch control pack. This creates difficulties in integrating the electronic current limiting device with the winch. A second area of concern is adaptability. Prior electronic current limiting devices used a potentiometer to set a threshold load limit. Potentiometers are vulnerable to damage and suffer from relatively less accuracy in setting and less accuracy in consistency from unit to unit. Also, potentiometers can vary setting in response to vibration, and therefore may drift from a previous setting. Furthermore, unsophisticated users gaining access to the potentiometer can modify the threshold setting and potentially establish damaging or hazardous operating conditions. Accordingly, a versatile yet less accessible method of setting the threshold is desirable. It would be desirable, therefore, to provide an electronic current limiter locking into an established threshold setting without variation in response to vibration.

Furthermore, potentiometers required that the package could not be sealed permanently. Because the package required access for resetting a threshold value, the package could only be sealed in a limited fashion. Accordingly, it would be desirable to provide a current limiting device having adjustability in threshold values, but not requiring that the device by opened to allow adjustment in threshold value. Accordingly, such a device could be hermetically sealed permanently for better protection against moisture and debris.

Accordingly, it would be desirable to provide a simplified interface relative to an existing winch system whereby a current limiting device may be integrated without extensive modification to the winch system while also providing a highly accurate, fast current limiting protective device.

SUMMARY OF THE INVENTION

In accordance with the present invention interfacing between an electronic current limiter and a motor is made more simple by taking a differential load signal from a cable coupling a solenoid pack and the electric motor. The differential signal may then be applied to signal conditioning circuitry to produce a stable load signal representing in linear fashion load conditions on the motor. This provides opportunity for better sealing the load limiting circuitry against damage or contamination during operation. In accordance with another aspect of the present invention, the electronic current limiter may be programmed to accept a new threshold value by monitoring a programming input thereof. By asserting the programming input, the electronic current limiter accepts a current load signal input as a new threshold value. In this manner, the device may be programmed to accept a new threshold under simulated load conditions or under actual load conditions.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

The present invention finds application in a winch assembly by serving as a shut-off device halting winch operation under certain conditions, i.e., under potentially damaging or hazardous conditions. As used herein, the term "winch" shall refer generally to any device employing an electric motor to move a load. Thus, a winch as used herein may refer to devices for lifting loads or pulling loads and need not be limited to any particular application.

Figure 1:
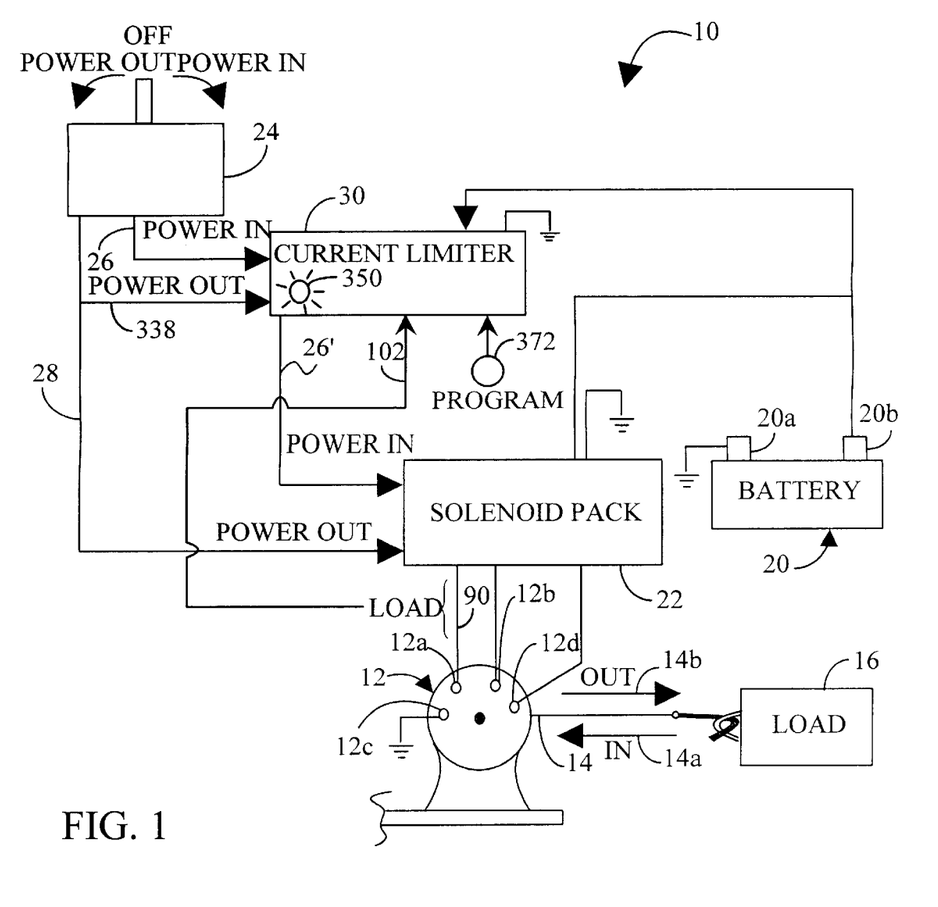
FIG. 1 illustrates generally a winch system and electronic current limiter according to a preferred embodiment of the present invention.

FIG. 1 illustrates a winch system 10 in accordance with a preferred embodiment of the present invention. Winch system 10 includes an electric motor 12 with a spool (not shown) for deploying or collecting a cable 14 attached to a load 16. Control terminals 12a and 12b of motor 12 receive electrical energy and, depending on the relative potential therebetween, cause motor 12 to operate in one of two rotational directions. A third terminal 12c of motor 12 ties to ground potential. A fourth terminal 12c ties to the armature of motor 12. While a variety of electric motors may be monitored under the present invention, motor 12 as illustrated herein is a series wound electric motor. By manipulating the relative potential between terminals 12a and 12b, motor 12 may be driven into one of two rotational directions. More particularly, motor 12 operates in one mode to collect cable 14 by movement toward motor 12 in a direction 14a and in another mode to deploy cable 14 outward in a direction 14b. As may be appreciated, movements of cable 14 in directions 14a and 14b are "powered" movements under the influence of motor 12. Generally, however, inward movement, i.e., in direction 14a, typically represents potential damage to motor 12 should the load bind and prevent further collection of cable 14 by motor 12. Under such conditions, motor 12 draws significant current and a variety of damaging or destructive events may occur including breaking cable 14, damaging load 16, damaging gears and transmission components of winch system 10, or damaging the mounting structure upon which system 10 resides.

Motor 12 receives electrical energy from a battery 20. To accomplish selected control over motor 12, however, electrical energy from battery 20 routes through a solenoid pack 22. As may be appreciated, solenoid pack 22 selectively provides no energy to motor 12, energy for operation in direction 14a, or energy for operation in direction 14b. Use of solenoid pack 22 for this purpose is well known in the art. Thus, terminal 20b of battery 20 applies to solenoid pack 22, and solenoid pack 22 couples to the terminals 12a, 12b, and 12d of motor 12. Terminal 20a of battery 20 ties to ground potential.

System 10 further includes a manual control or switch 24, e.g., a hand held control device providing an operator/user control over operation of winch system 10. Generally, manual control 24 comprises a three-way toggle switch normally maintained in a neutral position, but which may be moved to one of two operational positions for operation of winch system 10 in directions 14a and 14b. Thus, control 24 operates in three modes, i.e., power out, off, and power in. Control 24 provides as output a power in signal 26 and a power out signal 28.

In the particular embodiment shown herein, signal 28 carries a positive voltage for application directly to solenoid pack 22 to invoke the associated function. Accordingly, an operator of switch 24 can always invoke the power out function relative to solenoid pack 22 and motor 12. When released, i.e., not manually moved to one of the operational positions, control 24 provides a zero potential to solenoid pack 22. In the particular embodiment illustrated herein, motor 12 shut down occurs only with respect to the power in, i.e., collection of cable 14 in the direction 14a, mode of operation. Deploying cable 14, i.e., in the direction 14b, does not generally result in an overload condition for motor 12 and need not be monitored for an overload condition.

A current limiter 30 receives the power in signal 26 from switch 24 and provides a qualified power in signal 26' to solenoid pack 22. Current limiter 30 receives a load signal 102 indicating the current load conditions on motor 12 and determines as a function thereof application of the qualified power in signal 26' to solenoid pack 22. In other words, current limiter 30 has control over the power in function and can halt operation of motor 12 when necessary, i.e., when load conditions on motor 12 exceed a selected load threshold as described more fully hereafter. In accordance with one aspect of the present invention, the load signal 102 is taken as a differential signal from a cable or shunt 90 coupling solenoid pack 22 and motor 12. This establishes a simple interface between current limiter 30 and motor 12 for purposes of monitoring load conditions. In effect, the small resistance to current developed by cable or shunt 90 creates a small voltage potential providing a differential load signal 102 as described more fully hereafter. Current limiter 30 also includes an LED 350 providing information to the operator/user of switch 24. Current limiter 30 also receives as signal 338 a copy of the power out signal 338 for controlling operation of current limiter 30 as described more fully hereafter. Finally, current limiter 30 includes a program terminal 372 used to establish a threshold load condition for motor 12, i.e., a threshold load at which current limiter 30 halts further operation of motor 12 as described more fully hereafter.

Figure 2A:
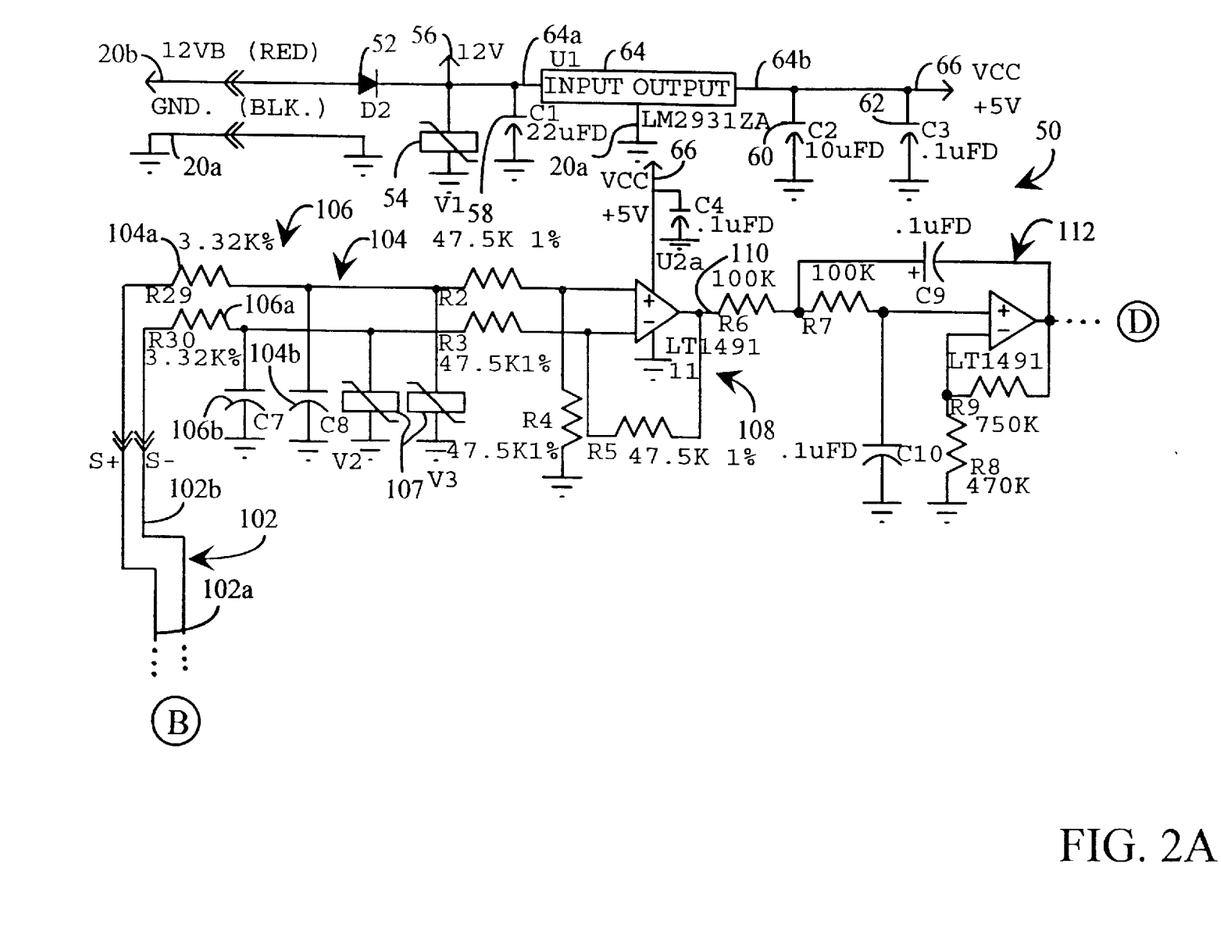
FIGS. 2A–2C collectively illustrate by schematic diagram the winch system of FIG. 1 including a control function halting operation of the winch in response to load conditions.
Figure 2B:
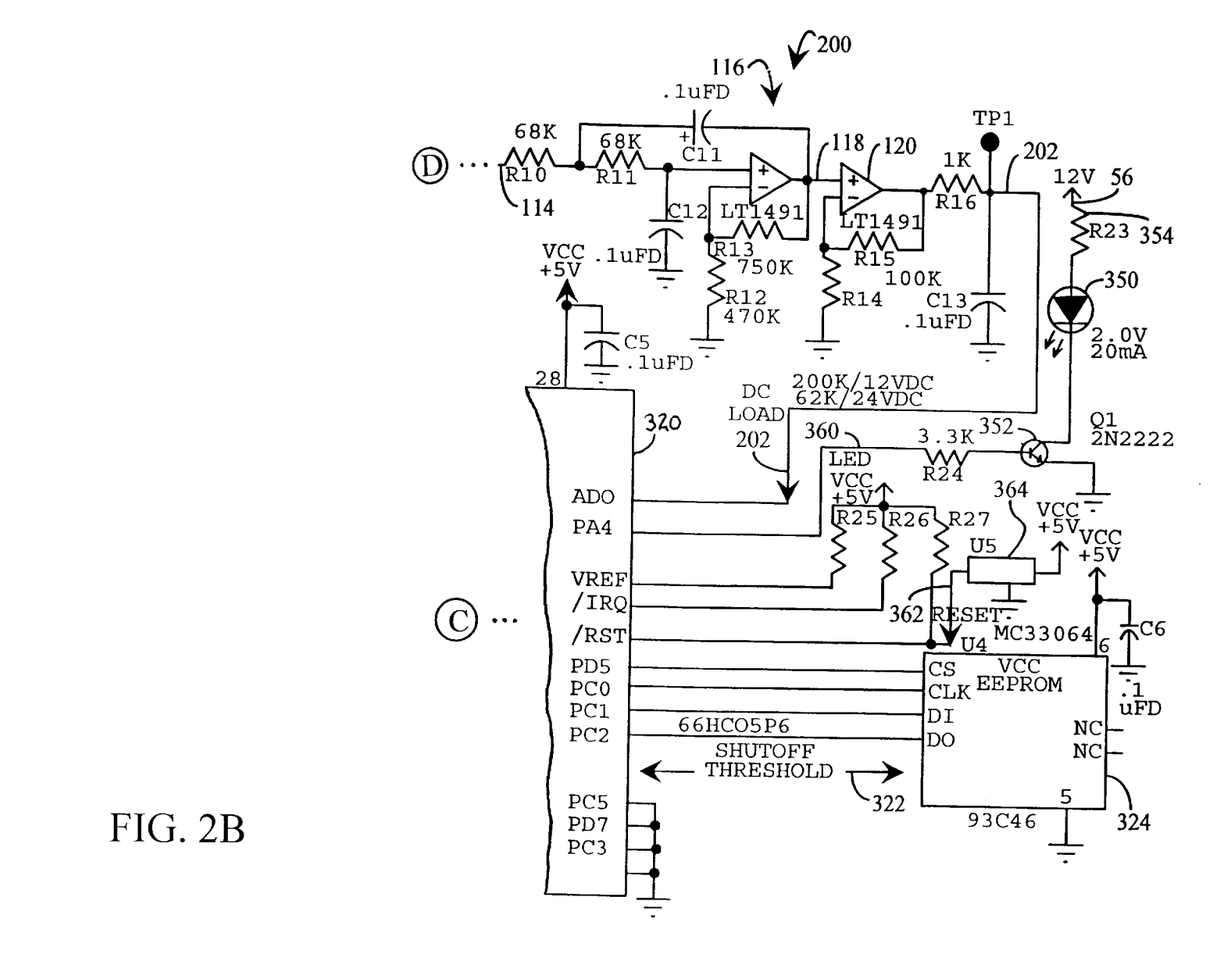
Figure 2C:
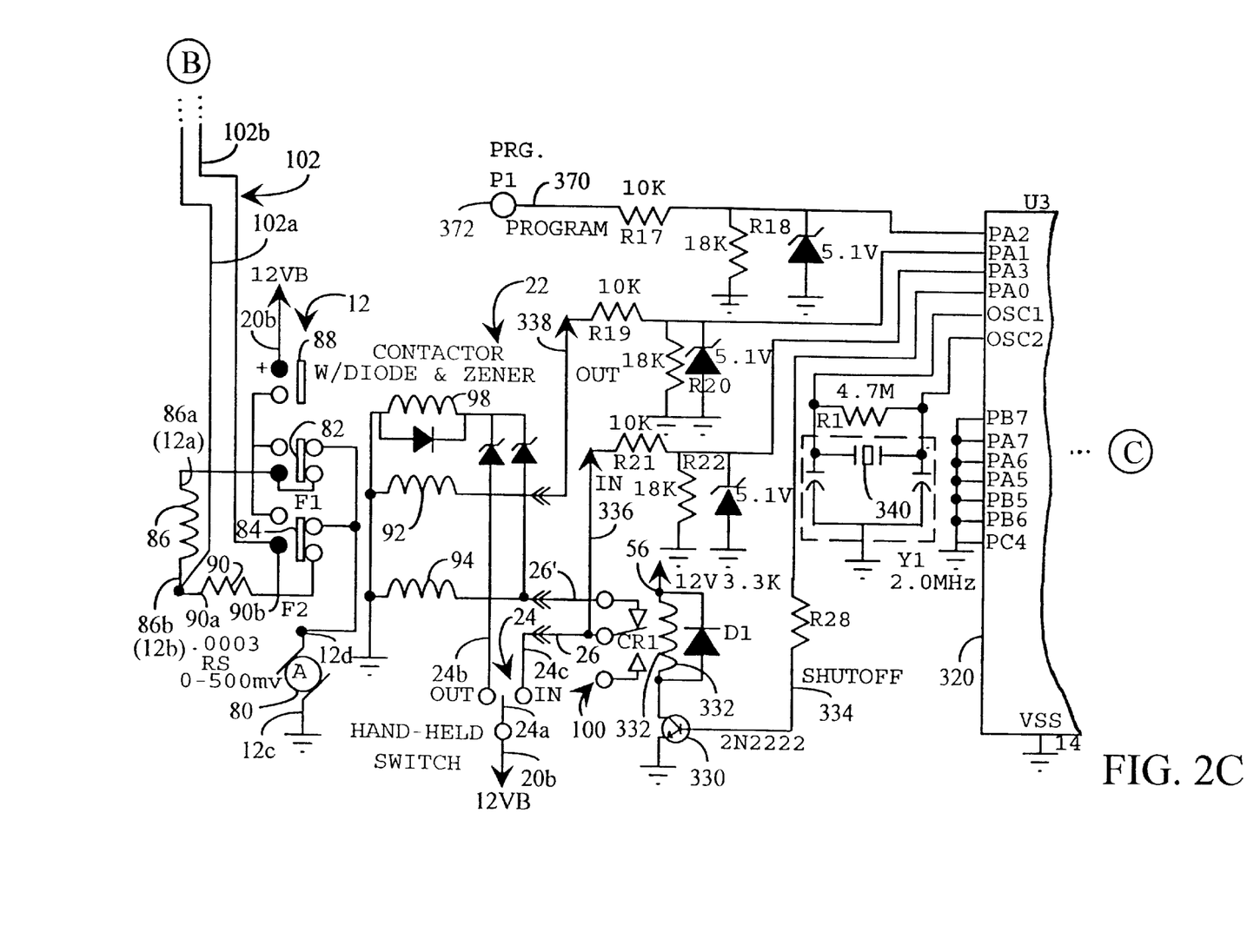

FIGS. 2A–2C collectively illustrate in full detail by schematic diagram the electronic circuitry for the winch system 10 of FIG. 1 The schematic illustration of FIGS. 2A–2C includes component specifications and has performed successfully as an electronic current limiting device in a winch system.

In FIGS. 2A–2C, a power supply 50 couples to battery 20 (not shown in FIGS. 2A–2C) at terminal 20a as a ground reference and at terminal 20b as a positive voltage reference. While coupled to a 12 volt power supply, e.g., a typical vehicle battery, power supply 50 supports input voltages in a range of 6 volts up to 30 volts DC while maintaining a stable 5 volt output. Diode 52 provides reverse polarity protection. A transient suppressor 54, a very fast-acting diode, couples diode 52 to ground and provides a 12 volt reference 56. device. Capacitors 58, 60, and 62 serve as filters eliminating high and low frequency noise present on terminal 20b of battery 20. A voltage regulator 64 receives at its input 64a the 12 volt reference 56 as conditioned by virtue of transient voltage suppresser 54 and capacitor 58 and provides at its output terminal 64b a stable 5 volt reference 66 as conditioned by capacitors 60 and 62 to provide a local 5 volt power supply applicable at various points throughout the illustrated device.

Power supply 50 provides a stable power supply at reference 66, i.e., a stable 5 volt potential, through a broad range of input voltages, occurring across terminals 20a and 20b of battery 20. Because battery 20 also serves as an energy source for motor 12, drastic voltage swings occur during operation of motor 12. Power supply 50 maintains, however, a stable potential at reference 66. For example, in the particular application illustrated, running motor 12 can reduce the potential at terminals 20a and 20b to approximately six to seven volts. Despite such wide variation in input voltage, a constant and stable reference 66 remains as a power supply for the current limiting device 30 of the present invention.

Electric motor 12 is a series wound motor with its armature 80 tied to ground potential through the internal body of motor 12. The opposite side of armature 80 ties selectively through one of field contact 82 and field contact 84. Thus, one of contacts 82 and 84 is activated to pass current in a selected direction through field 86. More particularly, actuating contact 82 causes current to flow through field 86 from end 86a toward end 86b. Similarly, actuating contact 84 causes current to flow through field 86 from end 86b toward end 86a. In either case, current passes through a shunt 90 and eventually through armature 80 to ground. End 86a of field 86 corresponds to terminal 12a (FIG. 1) of motor 12 and end 86b of field 86 corresponds to terminal 12b (FIG. 1) of motor 12. Contacts 82 and 84 thereby dictate the direction of operation for motor 12. Main contactor 88 selectively couples contacts 82 and 84 to the positive battery 20 terminal 20b.

Coils 92, 94, and 98 each operate a corresponding one of contacts 82, 84, and 88, respectively. Thus, by appropriately energizing members of the set of coils 92, 94, and 98, motor 12 operates in a selected direction. Switch 24 selectively couples coils 92, 94, and 98 to the positive battery 20 terminal 20b thereby providing the operator/user with control over activation and direction of operation for motor 12.

More particularly, switch 24 includes a common terminal 24a tied to terminal 20b of battery 20. When released, switch 24 isolates terminal 24a relative to out terminal 24b and relative to in terminal 24c. Moving switch 24 to its power out position couples out terminal 24b to terminal 20b of battery 20. This energizes coil 98 to engage main contact 88 and energizes coil 92 to engage contact 82 and operate motor 12 in its out direction 14b. Thus, switch 24 has direct access to coils 98 and 92 to invoke operation of motor 12 in the out direction 14b.

The in terminal 24c of switch 24 does not, however, couple directly to coils 94 and 98. More particularly, terminal 24c couples to coils 94 and 98 via a normally closed shut off relay 100. With reference to FIG. 1, switch 24 provides the power in signal 26 to relay 100 and relay 100 provides the qualified power in signal 26' to solenoid pack 22. As will be described more fully hereafter, relay 100 allows normal operation of motor 12 in response to operation of switch 24, i.e., allows operation of motor 12 in the in direction 14a when terminal 24a couples to terminal 24c thereby energizing coils 94 and 98 to operate motor 12 toward the in direction 14a. Activating relay 100, i.e., opening relay 100, prevents operation of motor 12 in the in direction 14a.

Shunt 90 couples end 86b of field 86 to contact 84. During operation of motor 12, shunt 90 carries all current employed in energizing motor 12 and thereby provides a basis for detecting a load force applied to motor 12. As discussed above, shunt 90 is simply the cable coupling solenoid pack 22 to motor 12. Accordingly, this power conducting cable is accessible and may be tapped by signal conductors to take a differential signal therefrom as a basis for inferring current flow therethrough and load conditions upon motor 12. This creates a much simplified interface requirement for current limiter 30 relative to solenoid pack 22 and motor 12. Because shunt 90 presents a small magnitude resistance to current flow a potential develops across terminals 90a and 90b of shunt 90 representing the magnitude of current drawn by motor 12. As will be described more fully hereafter, detecting the relative potential of terminal 90a relative to terminal 90b of shunt 90 provides a basis for determining existing load conditions on motor 12. This in turn provides a basis for halting further operation of motor 12 when load conditions exceed a selected threshold, i.e., engaging shut off relay 100 when load conditions exceed a selected threshold.

A load signal 102 may be taken from motor 12 by detecting the potential across shunt 90. Because load sensing is only conducted while operating motor 12 in the in direction 14a, load signal 102 is taken as the potential found at conductor 102a, as coupled to end 90a of shunt 90, relative to conductor 102b, as coupled to end 90b of shunt 90.

Figure 3:
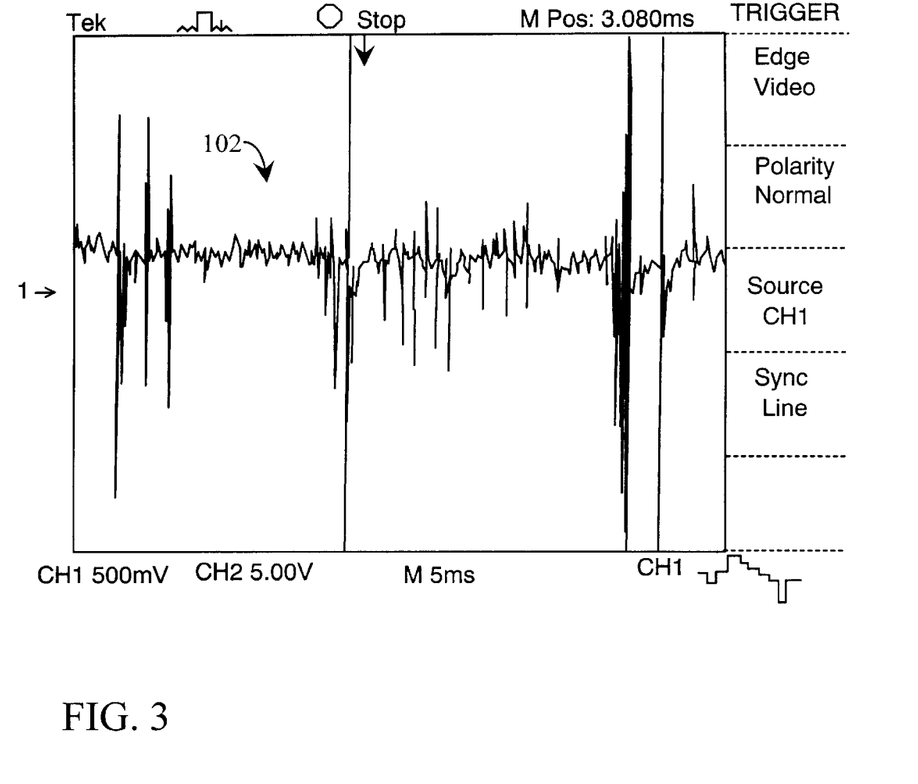
FIG. 3 illustrates a non-conditioned load signal waveform associated with normal operation of the winch system of FIGS. 1 and 2.

FIG. 3 illustrates load signal 102 as a relatively unstable waveform with significant high frequency components. To prevent false alarms, i.e., inappropriately halting operation of motor 12, one cannot simply react to a given magnitude voltage in load signal 102 as such voltage spikes normal during motor 12 operation. Variation in load signal 102 results from a variety of sources including gear train mesh frequency characteristics. The subject matter of the present invention distinguishes normal operation of motor 12 as represented in the waveform of FIG. 3 relative to abnormal operation of motor 12 as occurs when load signal 102 goes to and maintains a given magnitude voltage potential.

Returning now to FIGS. 2A–2C, load signal 102 applies to a signal conditioning circuit 200. Signal conditioning circuit 200 accepts load signal 102 as a differential input and provides as an output a DC load signal 202 operating as a stable DC voltage signal in a selected voltage range. In the particular embodiment illustrated herein, DC load signal 202 is a stable voltage signal in a range of zero to five volts. A reading of zero volts in DC load signal 202 corresponds to an inactive state for motor 12 and a reading of five volts corresponds to an absolute maximum load or stall condition for motor 12.

Figure 4:
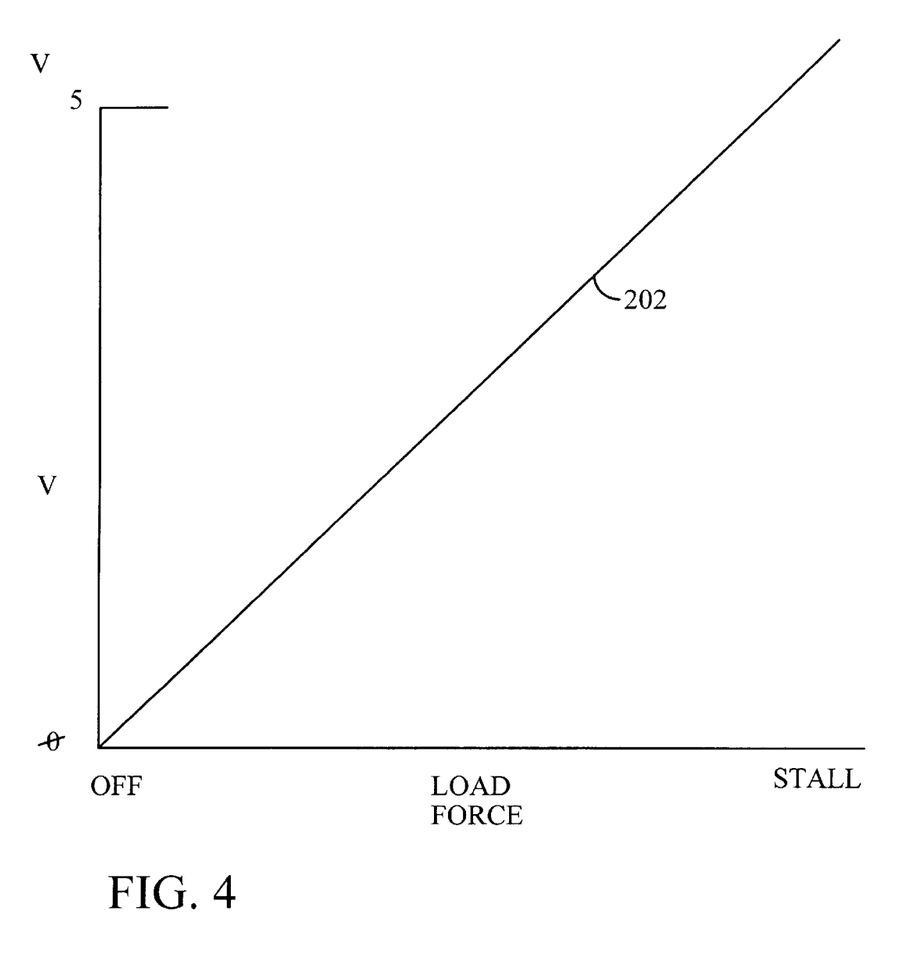
FIG. 4 illustrates a linear relationship between a conditioned DC load signal and load force applied to the winch system of FIGS. 1 and 2.

FIG. 4 illustrates a linear relationship between the voltage of DC load signal 202 and the load force experienced by motor 12.

Returning to FIGS. 2A–2C, generally signal conditioning circuit 200 includes at its input stages a series of filters removing unwanted high frequency components and at its output stage a gain control producing the final DC load signal 202. Load signal 102 applies initially to a pair of low pass filters 104 and 106. More particularly, conductor 102a couples to an input side of a resistor 104a with the opposite side of resistor 104a tied to ground through a capacitor 104b to form low pass filter 104. Similarly, conductor 102b couples at an input side of a resistor 106a with the other side of resistor 106a tied to ground through a capacitor 106b to form low pass filter 106. Low pass filter 104 106 thereby eliminate from conductors 102a and 102b very high frequencies and provide a more stable input to a differential amplifier 108. A pair of transient suppressers 107, however, tie the outputs of filters 104 and 106 to ground as a protective mechanism relative to differential amplifier 108.

Differential amplifier 108 operates in conventional fashion taking as its input the product of filters 104 and 106 and providing as its output 110 a representation of the relative magnitude of voltage potential in signal 102 as conditioned, i.e., as filtered, through low pass filters 104 and 106. The output 110 of differential amplifier 108, however, still contains a significant amount of the waveform characteristics as represented in FIG. 3. Accordingly, output 110 applies to a primary low pass active filter 112 producing an output 114. Output 114 is then applied to a next successive low pass active filter 116 providing an output 118.

Filters 112 and 116 as implemented by operational amplifiers are similar circuits, but employ components of different specifications to provide successively lower frequency filtering. As a result, output 118 of filter 116 has a maximum frequency of approximately 10 Hz, i.e., a relatively stable DC voltage representing in linear fashion the load conditions on motor 12. Output 118 is then applied to a gain control 120 producing the DC load signal 202 as a stable DC voltage in the range zero to five volts with a linear correlation to load conditions on motor 12.

Signal conditioning circuit 200 is highly responsive to motor 12 load conditions yet reliably produces a linear representation thereof, DC load signal 202 is a highly accurate and stable DC signal representing in linear fashion existing load conditions experienced by motor 12.

DC load signal 202 applies to a controller 320. More particularly, DC load signal 202 applies to the analog-to-digital converter channel of controller 320. Controller 320 thereby obtains a digital form of DC load signal 202. Controller 320 includes an internally stored program, discussed more fully hereafter, comparing the magnitude of DC load signal 202 to a selected shut off threshold 322 as stored in an EEPROM 324. Controller 320 stores in EEPROM 324 the selected shut off threshold 322 in a programming step discussed more fully hereafter. Controller 320 communicates with EEPROM 324 in conventional fashion, e.g., serial communication using two of the digital I/O ports of controller 320 for sending and receiving data relative to EEPROM 324. The other two digital I/O ports of controller 320 operate the clock and chip enable signals applied to EEPROM 324.

Thus, controller 320 operates generally to detect motor 12 operation beyond a selected threshold load. In such case, controller 320 activates shut off relay 100 thereby de-energizing coils 94 and 98 and halting further operation of motor 12. More particularly, a transistor 330 couples the coil 332 of relay 100 to ground potential with the other end of coil 332 tied to 12 volt supply 56. The base of transistor 330 receives a shut off signal 334 from controller 320. In this manner, controller 320 has direct control over shut off relay 100 and thereby direct control over operation of motor 12, i.e., can dictate immediate cessation of operation. Controller 320 receives an in signal 336 from terminal 24c of switch 24 and receives an out signal 338 from terminal 24b of switch 24. Controller 320 thereby "reads" the state of switch 24.

Ceramic resonator 340 supports operation of controller 320 in conventional fashion.

Controller 320 provides information to the operator of switch 24 by way of an LED 350. Transistor 352 couples LED 350 to ground potential and a resistor 354 ties the other end of diode 350 to 12 volt supply 56. Controller 320 thereby provides an LED signal 360 for application to the base of 352 to selectively operate LED 350. More particularly, by suitably manipulating LED signal 360 controller 320 implements a variety of signaling messages, e.g., LED on, LED off, LED flashing a certain number of times, LED flashing at certain rates. Such signaling messages may include information such as diagnostic test results, a shut down condition invoked by controller 320, normal operation, and disablement of the electronic current limiter protection provided.

Controller 320 receives a reset signal 362 from voltage detector 364. Voltage detector 364 applies reset signal 362 to the reset input of controller 320. In this manner, if the supply 66 for some reason drops below five volts, reset signal 362 resets operation of controller 320.

Controller 320 receives a program signal 370 from a programming pin 372. Program signal 370 indicates to controller 320 a need to read the current DC load signal 202 and adopt this value as a new shut off threshold 322 for storage in EEPROM 324. Under the present implementation, shut off threshold 322 is maintained in an 8 bit (one byte) word. This provides 256 states for the value to be stored in EEPROM 324. Under the present implementation, one of the states is reserved to indicate that no shut off threshold 322 is currently stored in EEPROM 324. For example, values in the range one to 255 represent in linear fashion values of DC load signal 202 between zero and five volts, respectively. The remaining state, i.e., value zero, for shut off threshold 322 represents a condition where no shut off threshold 322 is presently stored in EEPROM 324. This provides controller 320 a basis for ignoring DC load signal 202, i.e., disabling protection against excess load conditions.

Programming is conducted primarily at the distributor level, though anyone with the proper tools and equipment can obtain access to programming terminal 372 and, by asserting a selected DC load signal 202, program a new shut off threshold 322 for storage in EFPROM 324. Advantageously, controller 320 reads DC load signal 202 as a new shut off threshold value 322 during programming. This provides a variety of opportunities for programming the shut off threshold 322 including the application of a selected DC voltage as DC load 202, i.e., using a separate programming device (not shown) establishing a selected magnitude voltage for DC load 202. Furthermore, a new shut off threshold 322 may be established during programming conducted while actually operating motor 12 under load conditions. This provides opportunity to establish a new shut off threshold 322 as a function of actual load conditions. In a simple example of this important feature, motor 12 operates under a given load condition and one asserts program signal 370. Controller 320 then adopts the existing motor 12 load conditions as a new shut off threshold 322. Programming, however, is primarily designed to be done at the factory at the time of manufacture or at a distributor level according to some particular overall configuration, e.g., a particular vehicle with a particular winch mounting structure, a particular cable strength, and a particular expected use.

Out signal 338 as applied under the present invention resets controller 320. Thus, under a condition where controller 320 has opened relay 100 and shut down motor 12, operator engagement of switch 24 in the out position resets controller 320 and allows normal operation of motor 12. In other words, the operator returns to normal operation of motor 12 following a shut off invoked by controller 320 by simply moving switch 24 to the out position.

FIGS. 5–9 illustrate by flow chart programming executed by controller 320 in implementation of the preferred embodiment of the present invention. FIGS. 5A and 5B illustrate a main control loop including several sub-routines and FIGS. 6–9 illustrate in more detail these sub-routines. FIG. 5B is a continuation of FIG. 5A.

Figure 5A:
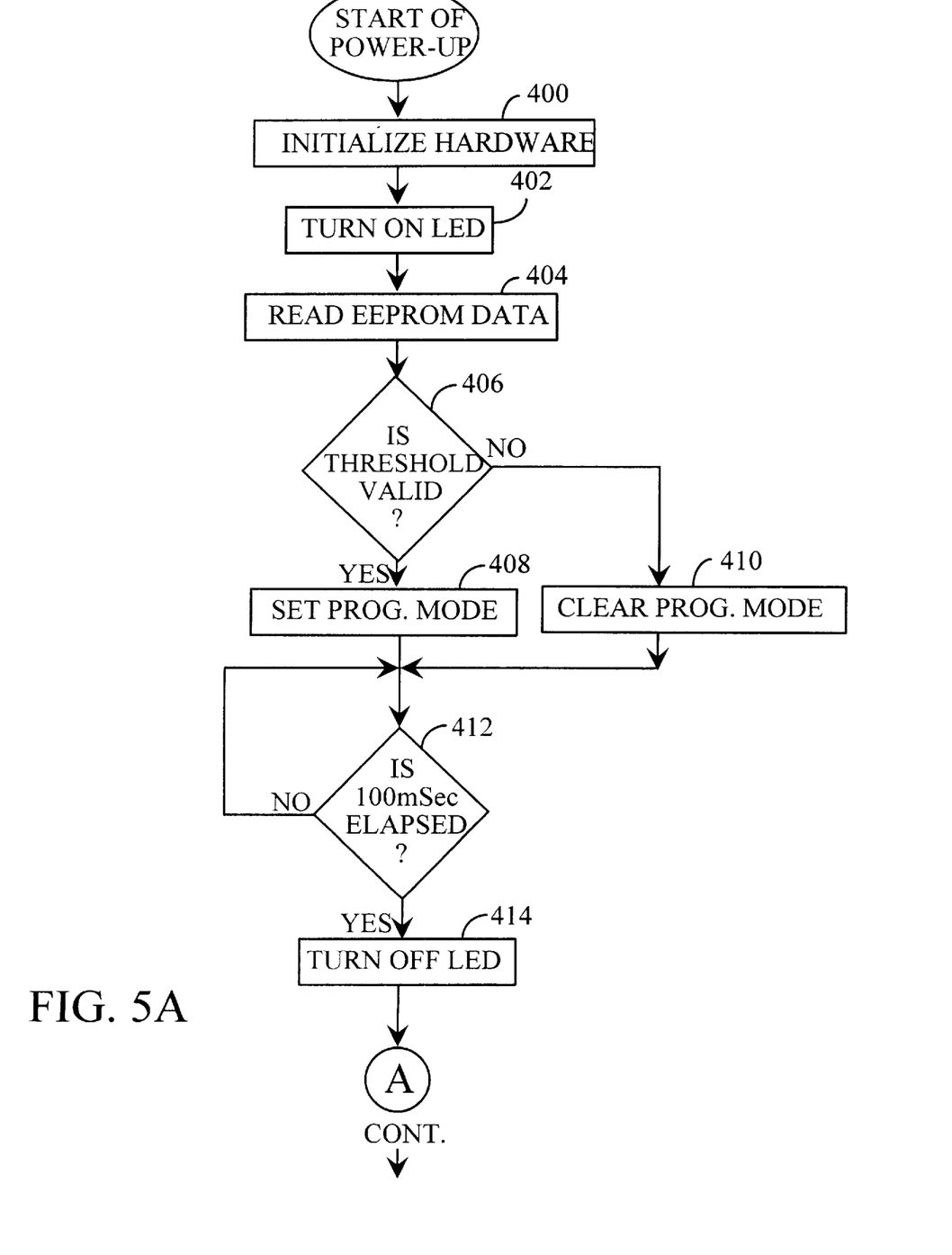
FIGS. 5A and 5B illustrate by flow chart programming executed under a preferred embodiment of the present invention.
Figure 5B:
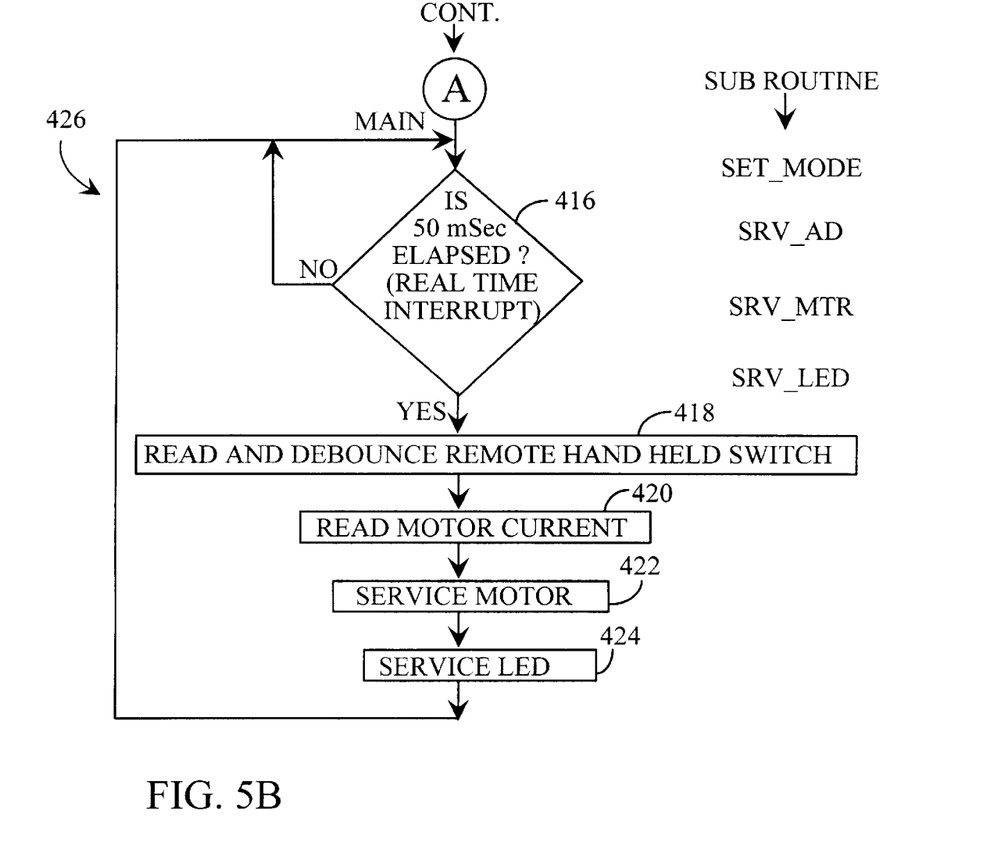

With reference to FIGS. 5A and 5B, following power up execution begins in block 400 where controller 320 initializes the hardware and various registers used. In block 400, controller 320 establishes various registers and memory locations used for variables and configures the various input and output channels as necessary. In block 402, controller 320 turns on LED 350 as an indication to the operator/user that programming has commenced. In block 404, controller 320 accesses EEPROM 324 and extracts therefrom the shut off threshold 322. In decision block 406, controller 320 tests the value read from EEPROM 324. If the value read is a valid shut off threshold 322, then programming advances to block 408. If the value read from EEPROM 324 is not a valid shut off threshold 322, then processing advances to block 410. When controller 320 executes block 408, it establishes the necessary conditions to execute electronic current limiting as described herein. Executing block 410, however, essentially disables current limiting functions, i.e., allows the operator to use the winch system 10 without any protection against current overload. Following either of blocks 408 and 410, processing loops at block 412 until a 100 mSec interval has elapsed.

Following decision block 412, processing advances to block 414 where controller 320 turns off LED 350. Once controller 320 has executed block 414, LED 350 has flashed on for approximately 100 mSec and turned off. This is a form of diagnostic message indicating that current limiter 30 has initialized itself and is ready to begin the main programming loop as illustrated in FIG. 5B.

In FIG. 5B, a main programming loop 426 includes four primary tasks and a decision block executed every 50 mSec. Decision block 416 tests a real time interrupt to determine the 50 mSec interval. Once the 50 mSec interval has expired, processing advances to block 418 where controller 320 reads and debounces the remote hand held switch 24. Block 418 is further detailed in FIG. 6 and will be discussed more fully hereafter. Following block 418, controller 320 executes block 420 where the current motor load conditions are interrogated. Block 420 is further detailed in FIG. 7 and will be discussed more fully hereafter. Continuing to block 422, controller 320 performs a motor service routine shown in greater detail in FIG. 8. Finally, in block 424 controller 320 performs an LED service routine illustrated in greater detail in FIG. 9.

As controller 320 executes the loop 426 illustrated in FIG. 5B, each of the tasks illustrated in blocks 416, 418, 422, and 424 are executed at least every 50 mSec. Accordingly, electronic current limiter 30 performs its analysis of motor 12 load conditions at high frequency and accuracy to provide a high degree of protection against damage or destruction of the winch system 10.

Figure 6:
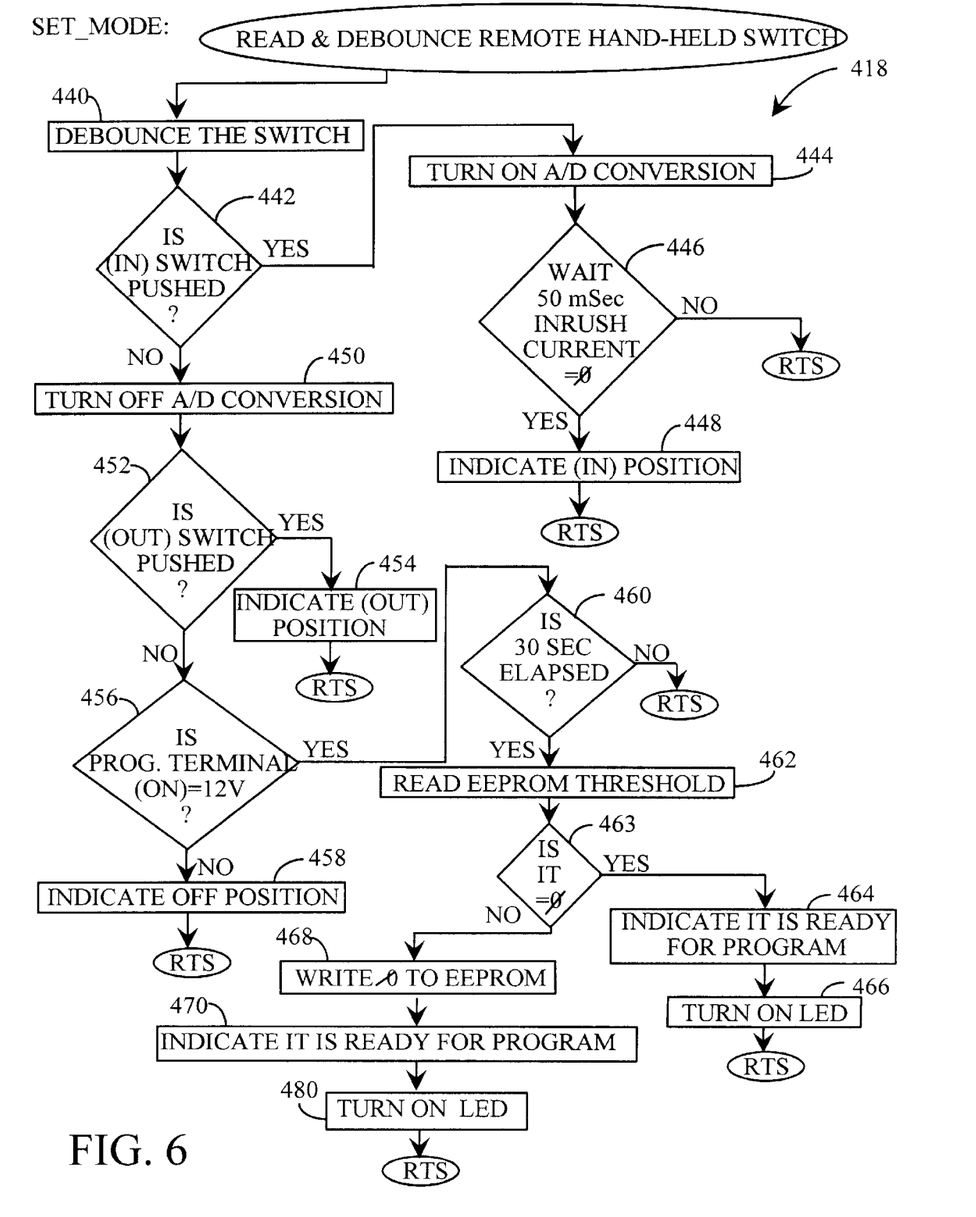
FIGS. 6–9 illustrate various sub-routines called by the main program control loop illustrated in FIGS. 5A–5B.

FIG. 6 illustrates in greater detail controller 320 treatment of user/operator activity at the remote hand held switch 24. In block 440, controller 320 reads and debounces the inputs 336 and 338 to obtain a valid representation of switch 24. If switch 24 has been moved to the in position, then processing branches from decision block 442 to block 444 where controller 320 turns on the analog-to-digital conversion channel and then advances to decision block 446. Decision block 446 allows a delay for an inrush current relative to motor 12. If an inrush current interval has not yet expired, then processing returns from block 418. If the inrush interval has expired, however, then processing advances from decision block 446 to block 448 where controller 320 accepts the in position for switch 24 and returns from block 418. Thus, programming associated with blocks 442, 444, 446, and 448 deal with the inrush condition associated with first activating an electric motor. Because of the large current drawn during the current inrush, current limiter 30 ignores the brief interval of high current associated with first activating motor 12 following the initial placement of switch 24 in the in position.

Returning to block 442, if switch 24 is not in the in position, then processing advances to block 450 where controller 320 turns off the analog-to-digital conversion channels. If switch 24 is in its out position, then processing branches at decision block 452 to block 454 where controller 320 accepts the out position for switch 24 and processing returns from block 418. If switch 24 is not in its out position, however, then processing advances to decision block 456 where controller 320 interrogates the programming terminal 372, i.e., looks for an asserted program signal 370. If the program signal 370 has not been asserted, then processing advances to block 458 where controller 320 accepts the off position for switch 24.

If in decision block 456 controller 320 detects assertion of the program signal 370, however, processing advances to block 460. In order to program controller 320 to have no shut off threshold 322, i.e., to disable electronic current limiting functions, controller 320 monitors program terminal 372 for presence of the program signal 370 during a 30 second interval. In other words, if the program signal 370 is asserted for 30 seconds then controller 320 writes a zero value into EEPROM 324 indicating no valid shut off threshold 322. If the 30 second interval has not yet elapsed, then processing returns from block 418. When the 30 second interval has elapsed, however, processing advances to block 462. Block 462 and the subsequent programming illustrated in FIGS. 6 has as its objective placing a zero value in EEPROM 324, i.e., to put an invalid shut off threshold 322 in EEPROM 324. Controller 320, however, avoids writing a zero value upon every iteration by first reading EEPROM 324 in block 62 and interrogating the value read in decision block 463. If decision block 463 indicates that the value stored in EEPROM 324 is already zero, then processing branches through block 464 where controller 320 indicates it is ready for programming and block 466 where it turns on LED 350. If in decision block 463 controller 320 determines that the value stored in FEPROM 324 is not zero, then processing advances to block 468 where controller 320 writes a value zero in EEPROM 324. Following block 468, processor 320 indicates in block 470 it is ready for programming and turns on LED 350 in block 480.

Figure 7:
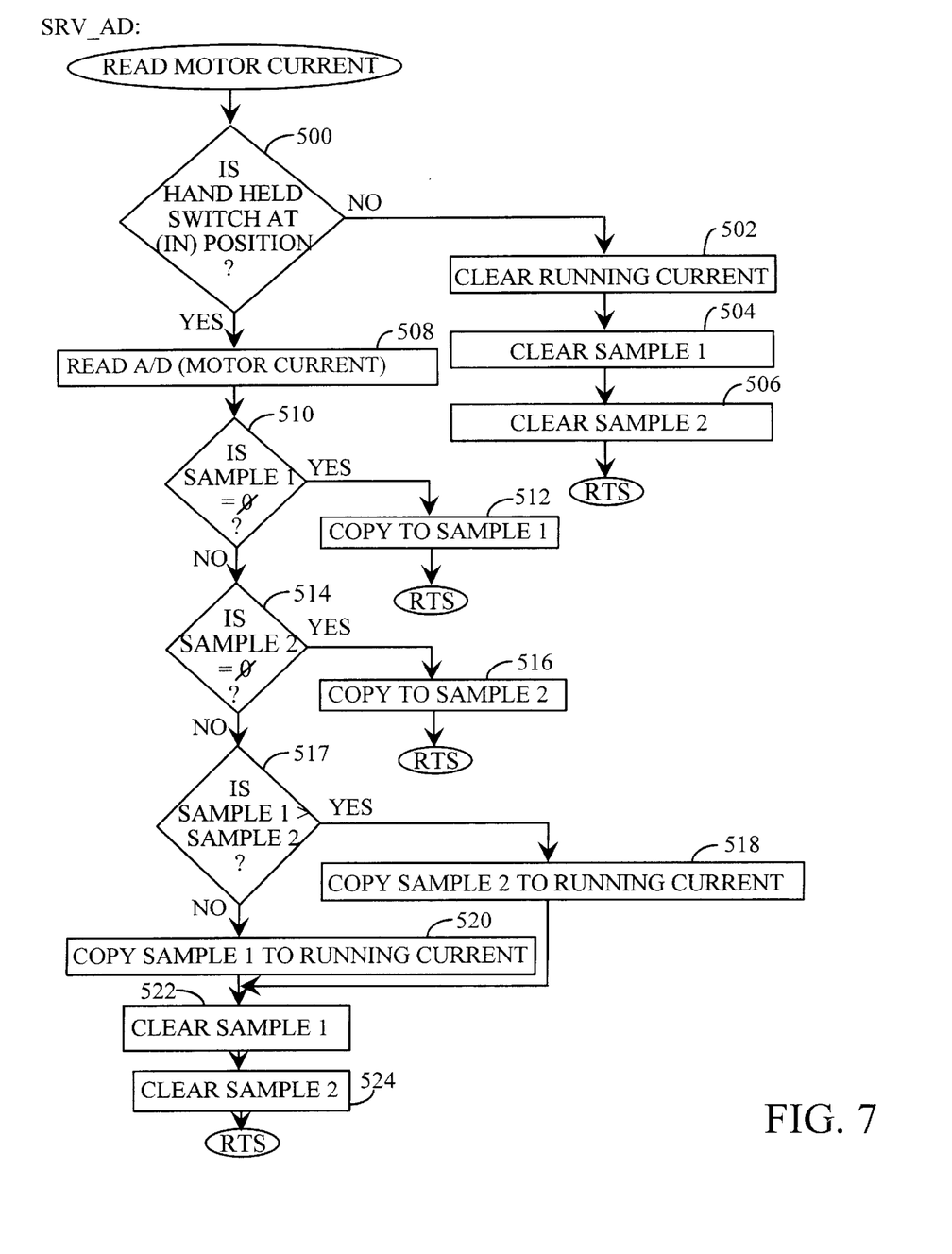

FIG. 7 illustrates in more detail controller 320 interrogation of existing load conditions on motor 12. Generally, controller 320 maintains a pair of sample variables, i.e., sample_1 and sample_2, and maintains a representation of motor 12 load conditions, i.e., variable running current. Once controller 320 has collected two samples and stored values in the sample_1 and sample_2 variables, then the least significant one is accepted as the representation of existing motor 12 load conditions and stored in the variable running current. If switch 24 is not in the in position, then processing branches to block 502 where controller 320 clears the current representation of motor current, to block 504 where controller 320 clears the variable sample_1, and to block 506 where controller 320 clears the variable sample_2 and returns from block 420. Thus, when switch 24 is not in its in position prior samples and representations of motor current are cleared in preparation for a subsequent interrogation of motor 12 current.

If switch 24 is in its in position, however, processing branches from block 500 to block 508 where controller 320 reads from its analog-to-digital channel the DC load signal 202. In decision block 510, controller 320 determines whether or not it has currently stored in its variable sample_1 a previous reading of DC load signal 202. If the variable sample_1 equals zero, indicating that the variable sample_1 is available, then processing branches to block 512 where controller 320 copies the most recently read value of DC load signal 202 into the variable sample_1 and returns from block 420. If the variable sample_1 is not available, i.e., is equal to zero, then processing advances from block 512 to block 514 where controller 320 determines whether the variable sample_2 is available. If sample 2 does not equal zero then processing advances to block 516 where the most recently read value for DC load signal 202 is copied into the variable sample_2 and programming returns from block 420. Eventually, processing through decision blocks 510 and 514 indicates that both sample_1 and sample_2 hold the most recent two values taken from DC load signal 202 and processing reaches decision block 517. Thus, at this point sample_1 and sample_2 represent two values recently taken from DC load signal 202 at approximately 50 mSec intervals. Decision block 517 compares sample_1 and sample_2 for purposes of adopting the lesser magnitude value.

Accordingly, if sample_1 is greater than sample_2 then processing branches to block 518 where controller 320 copies the value of sample_2 to the motor load variable. Otherwise, processing advances to block 520 where controller 320 copies the value of sample_1. In block 522 and 524, controller 320 clears the variables sample_1 and sample_2 in preparation for further interrogation of DC load signal 202.

Figure 8:
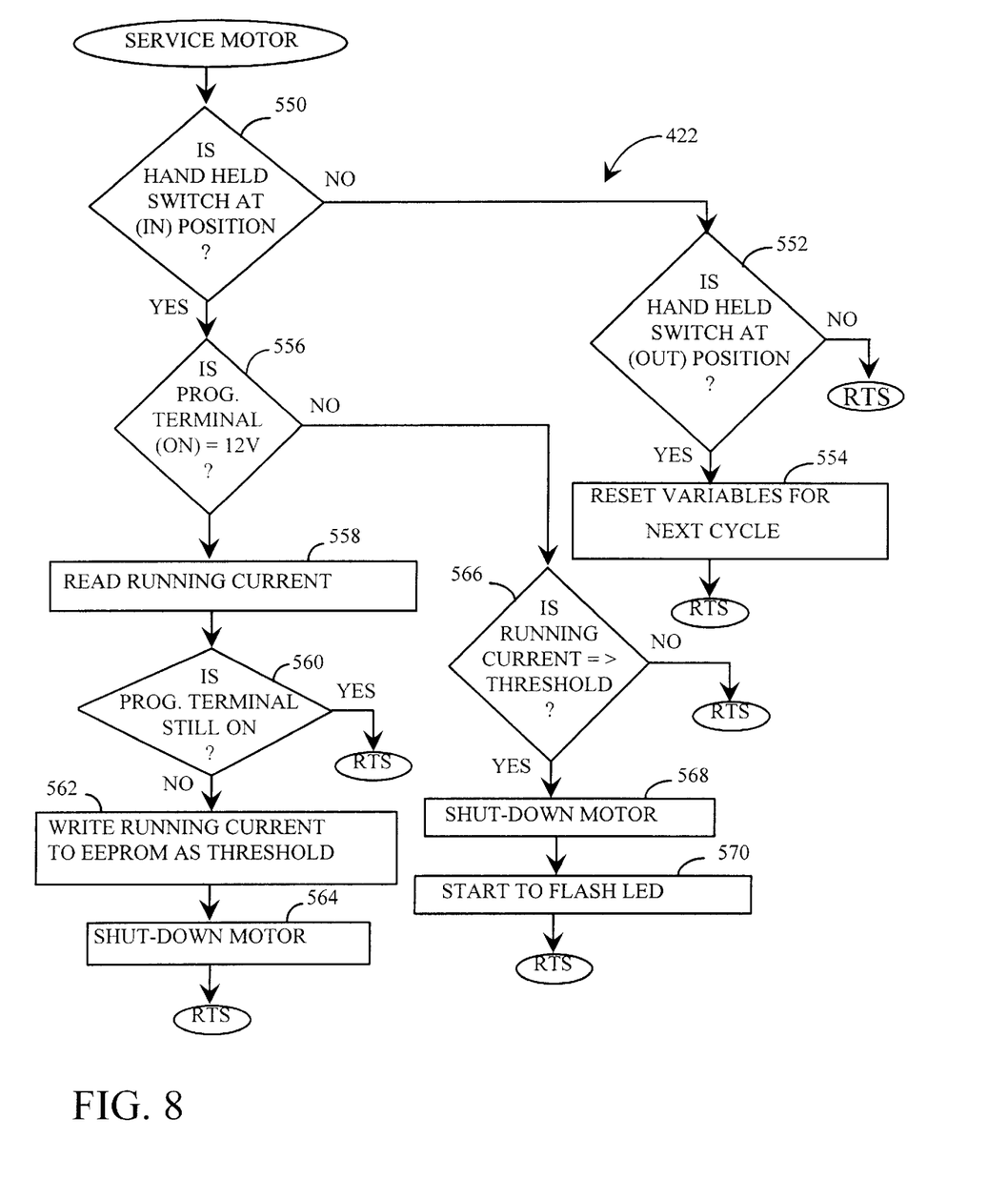

FIG. 8 illustrates in more detail the motor service routine of block 422. In decision block 550, controller 320 determines the condition of remote switch 24, i.e., whether switch 24 is in the in position. If switch 24 is not in the in position then processing advances to decision block 552 where controller 320 determines whether switch 24 is in the out position. If switch 24 is not in the out position then processing returns from block 422. If switch 24 is in the out position, however, then processing advances to block 554 where controller 320 resets variables in preparation for the next cycle. In other words, controller 320 clears all variables upon placement of the switch 24 in the out position thereby allowing normal operation of motor 12, i.e., disabling any pending control over motor 12 such as by activation of shut off relay 100. In other words, once the user/operator puts switch 24 in the out position, current limiter 30 does not prevent operation of motor 12 and all variables are cleared in preparation for the next occurrence of switch 24 being placed in the in position.

If controller 320 determines in decision block 550 that switch 24 is in the in position then processing advances to block 556 where controller 320 interrogates the program signal 370. If the programming signal 370 is asserted, i.e., indicating a desire to establish a new shut off threshold 322, processing advances to block 558 where controller 320 reads the current value from the variable running current. In decision block 560, controller 320 determines whether the programming signal 370 remains asserted, if not then processing returns from block 422. If, however, the programming signal 370 has been deactivated, i.e., indicating that the existing DC load signal 202 is to be adopted as a new shut off threshold 322, then processing advances to block 562 where controller 320 writes the value of the variable running current into the EEPROM 324 as the new shut off threshold 322. Following block 562, controller 320 executes a shut down motor procedure in blocks 564, i.e., actuates relay 100 to shut down motor 12.

Decision block 566 represents controller 320 opportunity to compare the current value of running current, i.e., the most recently accepted value for DC load signal 202, with the shut off threshold 322 stored in EEPROM 324. If running current is not equal to or greater than the threshold 322, then processing simply returns from block 422. If the running current variable is greater than or equal to the shut off threshold 322, however, then processing advances to block 568 where controller 320 shuts down further operation of motor 12 by actuating relay 100, i.e., by asserting shut off signal 334. Processing then advances to block 570 where controller 320 initiates an LED 350 flashing routine and processing returns from block 422.

Figure 9:
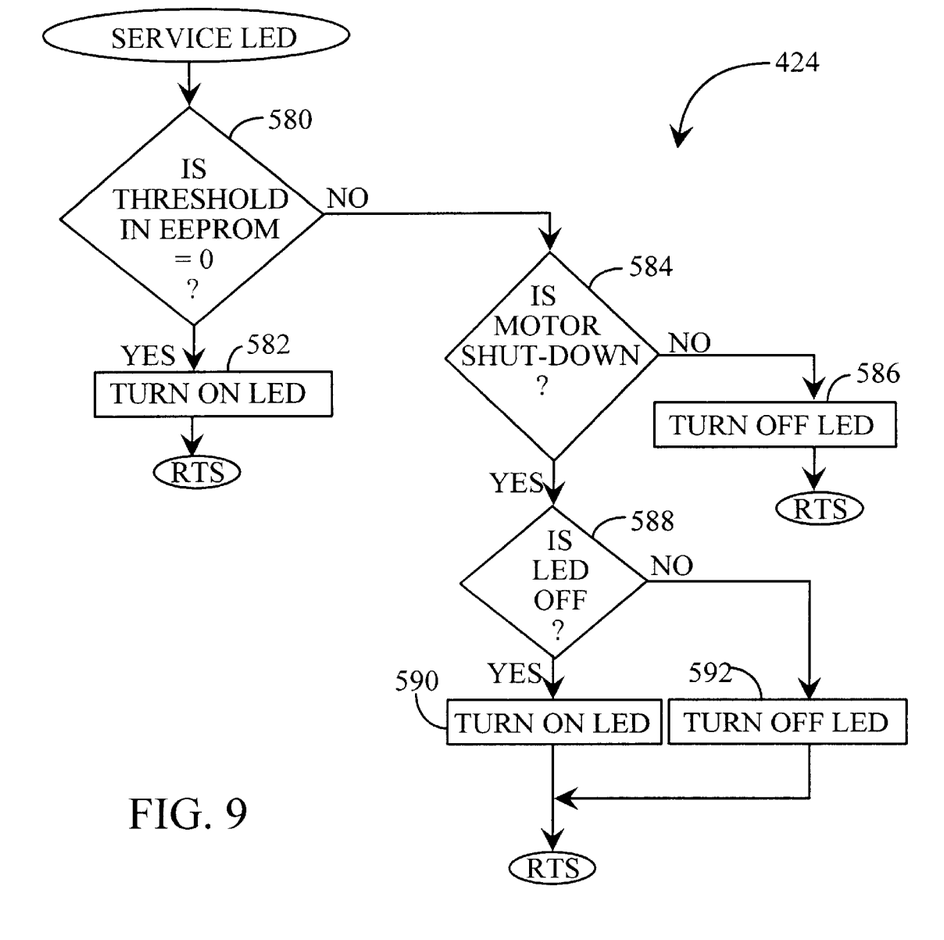

FIG. 9 illustrates in more detail the LED service routine of block 424. In decision block 580, controller 320 interrogates EEPROM 324 to determine if the value stored therein equals zero. If the value stored in EEPROM 324 equals zero, indicating that electronic current limiting protection is to be disabled, then processing advances to block 582 where controller 320 turns on continuously LED 350 and returns from block 424. If the value stored in EEPROM 324 is not equal to zero, i.e., is a valid shut off threshold 322, then processing advances to decision block 584 where controller 320 determines if the motor 12 has been shut down. If motor 12 has not been shut down then processing advances to block 586 where controller 320 turns off LED 350 and processing returns from block 424. If motor 12 has been shut down, however, then processing advances to decision block 588. In decision block 588, controller 320 determines whether LED 350 is off. If LED 350 is off, then LED 350 is turned on in block 590. If controller 320 determines in block 588 that LED 350 is on then processing advances to block 592 where controller 320 turns off LED 350. Following either of blocks 590 and 592 processing returns from block 422.

The microfiche appendix assembly language programming listing is an actual operating implementation of the present invention corresponding to the above-described flow charts and as used to operate the circuitry of FIGS. 2A–2C:

Thus an improved programmable electronic current limiter has been shown and described. The illustrated device enjoys a simple interface with, for example, an existing winch system, e.g., merely takes a differential signal from an existing power cable coupling the solenoid pack and the electric motor. Accordingly, the illustrated device requires no modification to the solenoid pack or electric motor and no current sensing device need be placed therein. The use of a differential voltage signal taken from the power cable provides a highly responsive load signal and signal conditioning circuitry removing high frequency components and providing a gain control produces a highly stable and accurate load signal for comparison to a previously stored threshold value. Programming of the device, i.e., establishing a threshold value, may be accomplished not only by simulation of a load signal, but also during actual load conditions. This opens a variety of possibilities with respect to programming by allowing establishment of a threshold shut off value as a function of actual operating conditions. The use of a digitally stored threshold value provides consistency and immunity from variation due to vibration. Furthermore, the device may be permanently sealed within a package without requiring access even for purposes of modifying the threshold value. Overall, a more reliable, more consistent, and more accurate current limiting function results.

It will be appreciated that the present invention is not restricted to the particular embodiment that has been described and illustrated, and that variations may be made therein without departing from the scope of the invention as found in the appended claims and equivalents thereof.

What is claimed is:

1. In a system including an electric motor and a contact device coupled thereto to by way of at least one power conductor cable, a load limiting device comprising:
   a shutoff device halting operation of said motor;
   a first signal conductor coupling a first end of said power conductor cable to said load limiting device;
   a second signal conductor coupling a second end of said power conductor cable to said load limiting device, said first and second signal conductors carrying a differential load signal representing electric current flow through said power conductor cable;
   a signal conditioning device receiving said differential load signal and filtering said signal to eliminate frequency components above a given frequency and delivering a stable load signal in a given signal range;
   a storage device holding a shutoff threshold value; and
   a comparator receiving said stable load signal from said signal conditioning device and receiving said shutoff threshold value from said storage device, said comparator actuating said shutoff device as a function of the relative values of said received shutoff threshold value and said stable load signal.

2. A system according to claim 1 wherein said given frequency is on the order of 10 Hz.

3. A system according to claim 1 wherein said stable load signal is a DC signal in a given range having a first end boundary corresponding to no current flow through said power conductor cable and second end boundary corresponding to a stall condition for said motor.

4. A system according to claim 1 wherein said shutoff device is a relay operable by said comparator and interposed between a control switch and a solenoid controlling operation of said motor.

5. A system according to claim 1 wherein said comparator is a programmable controller receiving an analog form of said stable load signal and producing a digital form of said stable load signal for comparison to a digital form of said threshold value.

6. A system according to claim 1 wherein said comparator includes a program input and responds thereto by accepting a current value for said stable load signal as a new shut off threshold value.

7. A system according to claim 1 wherein said signal conditioning device includes at an input stage low pass filters and at an output stage a gain control whereby said stable load signal is a stable DC signal limited by said gain control to a given range, said range corresponding in linear fashion to load conditions on said motor.

8. A system according to claim 7 wherein said threshold value corresponds to a value within said given signal range for said stable load signal.

9. A system according to claim 1 wherein said signal conditioning device, storage device, and comparator are sealed within a compartment allowing access therethrough via said first signal conductor and said second signal conductor.

10. In an electronic current limiter for an electric motor, the limiter receiving a load signal from the motor and representing a load condition relative to said motor, the limiter including a comparator comparing said load signal to a programmable shutoff threshold load value and halting operation of said motor as a function of said comparison, an improvement comprising:
    a threshold programming signal applied to said comparator, said comparator accepting and thereafter maintaining a current value of said load signal as a new shutoff threshold value for subsequent operation.

11. An improvement according to claim 10 wherein said load signal is a differential load signal taken from a power conducting cable applied to said motor, said power conducting cable having a given magnitude resistance and developing a corresponding magnitude voltage in response to current therethrough whereby said differential load signal may be taken from two separate points on said cable.

12. An improvement according claim 11 wherein said differential load signal is applied to a signal conditioning circuit filtering high frequency components therefrom and producing a stable DC voltage load signal for application to said comparator.

13. An improvement according to claim 10 wherein said electronic current limiter may be programmed to accept a new shut off threshold value during actual load conditions.

14. An improvement according to claim 10 wherein said electronic current limiter may be programmed to accept a new shut off threshold value in response to a simulated load condition represented by application of a simulated load signal thereto.

15. An improvement according to claim 10 wherein said comparator is a programmable controller receiving an analog form of said load signal at an analog-to-digital converter channel thereof and said threshold value is a stored digital value.

* * * * *